United States Patent
Downs et al.

(10) Patent No.: US 10,466,865 B2
(45) Date of Patent: Nov. 5, 2019

(54) APPARATUS AND METHODS FOR CONSOLIDATING MULTIPLE ENTRIES IN AN ELECTRONIC CHECKLIST SYSTEM

(71) Applicant: THE BOEING COMPANY, Chicago, IL (US)

(72) Inventors: Joshua Lee Downs, St. Charles, MO (US); Mark I. Nikolic, Seattle, WA (US); Paul T. Snow, Seattle, WA (US); Vikram H. Pandya, St. Charles, MO (US); Alex J. Campise, Creve Coeur, MO (US); David A. Green, Brier, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/299,352

(22) Filed: Oct. 20, 2016

(65) Prior Publication Data
US 2018/0113572 A1 Apr. 26, 2018

(51) Int. Cl.
*G06F 3/048* (2013.01)
*G06F 3/0482* (2013.01)
*B64D 37/26* (2006.01)
*B64D 43/00* (2006.01)
*G06Q 10/10* (2012.01)
*G06F 3/041* (2006.01)
*G06F 3/0484* (2013.01)

(52) U.S. Cl.
CPC .......... *G06F 3/0482* (2013.01); *B64D 37/26* (2013.01); *B64D 43/00* (2013.01); *G06Q 10/109* (2013.01); *G06F 3/041* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 5,454,074 A | 9/1995 | Hartel et al. | |
| 6,262,720 B1 | 7/2001 | Jeffrey et al. | |
| 6,609,082 B2 | 9/2003 | Wagner | |
| 6,636,786 B2 | 10/2003 | Partel | |
| 6,753,891 B1 * | 6/2004 | Chohan .................. | G06Q 10/06 701/538 |
| 6,759,891 B2 | 6/2004 | Chohan et al. | |

(Continued)

FOREIGN PATENT DOCUMENTS

WO WO0235303 A2 5/2002

OTHER PUBLICATIONS

Extended European Search Report for Application No. 17195628.7, dated Dec. 8, 2017, 7 pgs.

(Continued)

*Primary Examiner* — William C Trapanese
(74) *Attorney, Agent, or Firm* — Toler Law Group, PC

(57) ABSTRACT

A method includes displaying, on an electronic display, an electronic checklist. The method further includes determining whether the electronic checklist includes a checklist item associated with states of multiple components of a subsystem associated with the electronic checklist. The method further includes, based on determining that the electronic checklist includes the checklist item associated with the states of the multiple components, displaying, on the electronic display, a single option that is selectable to send control commands to the multiple components.

20 Claims, 9 Drawing Sheets

(56) References Cited

U.S. PATENT DOCUMENTS

| | | | |
|---|---|---|---|
| 7,392,486 B1 | 6/2008 | Gyde et al. | |
| 8,660,718 B2 | 2/2014 | Holder | |
| 8,761,971 B2 | 6/2014 | Gershzohn | |
| 9,569,323 B1 | 2/2017 | Gershzohn | |
| 2004/0088535 A1 | 5/2004 | Jones et al. | |
| 2012/0209468 A1 | 8/2012 | Thomas | |
| 2013/0066487 A1* | 3/2013 | Holder | G08G 5/0021 701/14 |
| 2014/0095012 A1 | 4/2014 | Wischmeyer | |
| 2014/0200748 A1 | 7/2014 | Porez et al. | |
| 2015/0348420 A1 | 12/2015 | Kneuper et al. | |
| 2016/0004374 A1 | 1/2016 | Kneuper et al. | |
| 2016/0300551 A1 | 10/2016 | Branthomme | |
| 2017/0088285 A1 | 3/2017 | Wischmeyer et al. | |
| 2017/0183085 A1 | 6/2017 | Branthomme et al. | |
| 2017/0210484 A1* | 7/2017 | Figard | B64D 45/00 |
| 2018/0292953 A1 | 10/2018 | Pandya et al. | |

OTHER PUBLICATIONS

Communication pursuant to Article 94(3) EPC dated Jan. 22, 2019 in corresponding EP 17195628.7, 5 pgs.

Gulfstream Symmetry Flight Deck—Piloting Perfected http://www.gulfstream.com/technology/symmetry-flight-deck, printed May 15, 2019, 2 pgs.

Gulfstream, Phase-of-Flight Intelligence Immersive Integration, http://www.gulfstream.com/technology/phase-of-flight-intelligence, printed May 15, 2019, 1 pg.

* cited by examiner

APPARATUS AND METHODS FOR CONSOLIDATING MULTIPLE ENTRIES IN AN ELECTRONIC CHECKLIST SYSTEM

FIELD OF THE DISCLOSURE

The present disclosure relates to electronic checklists.

BACKGROUND

Airplane checklists are used to facilitate proper configuration and operation of an airplane. Each checklist includes multiple checklist items corresponding to steps to be performed, checks to be performed, etc. Some of the checklists may direct a pilot or operator to configure multiple components into a same state. Sequentially and individually configuring the multiple components into the same state may be unnecessarily laborious.

SUMMARY

In a particular implementation, a method includes displaying, on an electronic display, an electronic checklist. The method further includes determining whether the electronic checklist includes a checklist item associated with states of multiple components of a subsystem associated with the electronic checklist. The method further includes, based on determining that the electronic checklist includes the checklist item associated with the states of the multiple components, displaying, on the electronic display, a single option that is selectable to send control commands to the multiple components.

In another particular implementation, a system includes a subsystem including multiple components. The system includes an electronic display and a processor coupled to the electronic display. The processor is configured to cause the electronic display to display an electronic checklist associated with the subsystem. The processor is further configured to determine whether the electronic checklist includes a checklist item associated with states of the multiple components. The processor is further configured to, based on determining that the electronic checklist includes the checklist item associated with the states of the multiple components, cause the electronic display to display a single option that is selectable to send control commands to the multiple components.

In another particular implementation, a non-transitory processor-readable medium stores processor-executable instructions that, when executed by a processor, cause the processor to cause an electronic display to display an electronic checklist. The instructions further cause the processor to determine whether the electronic checklist includes a checklist item associated with states of multiple components of a subsystem associated with the electronic checklist. The instructions further cause the processor to, based on determining that the electronic checklist includes the checklist item associated with the states of the multiple components, cause the electronic display to display a single option that is selectable to send control commands to the multiple components.

The features, functions, and advantages described herein can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Implementations disclosed herein enable controlling multiple components of a subsystem associated with a checklist by using a single selectable option displayed on an electronic display. A system associated with the checklist includes the subsystem including the multiple components, the electronic display, and a processor coupled to the electronic display. The processor is configured to cause the electronic display to display an electronic checklist associated with the subsystem. The processor is further configured to determine whether the electronic checklist includes a checklist item associated with states of the multiple components. The processor is further configured to, based on determining that the electronic checklist includes the checklist item associated with the states of the multiple components, cause the electronic display to display a single option that is selectable to send control commands to the multiple components.

Although implementations described below focus on implementations in an aircraft environment, the electronic checklist systems and methods described herein can be implemented in other environments, such as in different vehicles (e.g., submarines, spacecrafts, etc.) or in fixed location environments (e.g., power plants, chemical plants, or manufacturing plants). For example, the subsystem associated with the electronic checklist system described below with reference to FIGS. 1-9 may correspond to a subsystem of a submarine, a spacecraft, or a power plant, and the multiple components described below with reference to FIGS. 1-9 may correspond to multiple components of the subsystem of the submarine, the spacecraft, or the power plant. In these implementations, the electronic checklist systems and methods described below with reference to FIGS. 1-9 enable controlling multiple components of the subsystem of the submarine, the spacecraft, or the power plant by using a single selectable option displayed on the electronic display as described below with reference to subsystems and components of aircrafts.

Figure 1:
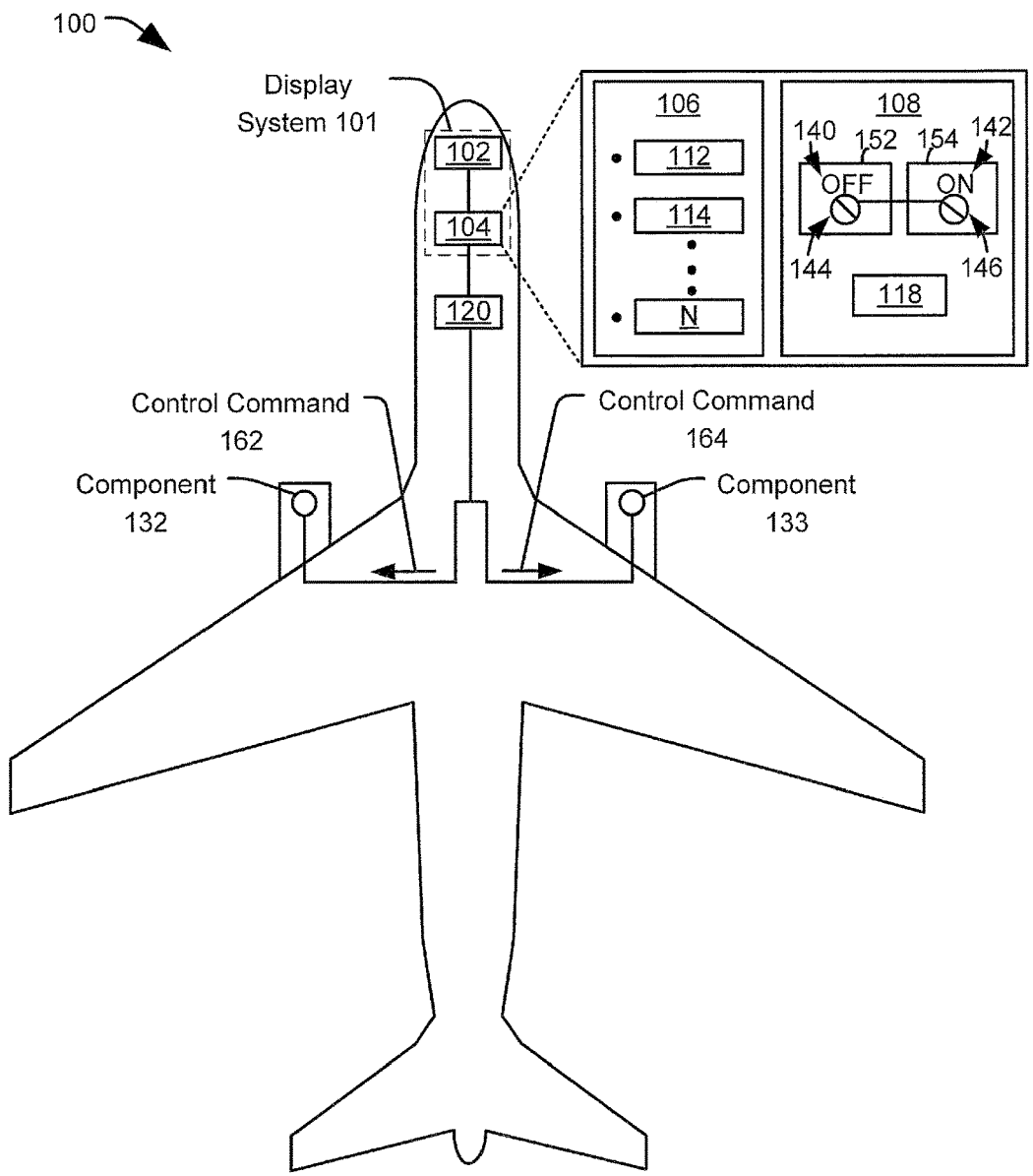
FIG. 1 illustrates an example of an aircraft that includes a display system configured to display an electronic checklist, a synoptic page, and a single option that is selectable to send control commands to multiple components of a subsystem of the aircraft.

FIG. 1 illustrates an outline of an aircraft 100 that includes multiple components (e.g., components 132, 133) of a subsystem of the aircraft 100 and includes a display system 101 that includes a processor 102 and an electronic display 104. In some implementations, the electronic display 104 is a touchscreen display (e.g., that is responsive to touch input from a user). The subsystem may include any aircraft subsystem, such as a fuel subsystem, an electrical subsystem, a hydraulic subsystem, etc. The components 132, 133 may include mechanical components, electrical components, electromechanical components, or a combination thereof, such as nozzles, pumps, valves, packs, circuits, switches, controllable/movable/selectable aircraft surfaces (e.g., flaps). As an example, the subsystem may include a fuel subsystem and the multiple components 132, 133 may include multiple fuel jettison nozzles.

The processor 102 is configured to cause the electronic display 104 to display an electronic checklist 106 associated with the subsystem. The electronic checklist 106 is a checklist for a subsystem of the aircraft 100 and includes one or more checklist items, such as the checklist items 112, 114 . . . N. Each of the checklist items 112, 114 . . . N may direct that one or more components (that are associated with the checklist item) be configured in a particular state. The electronic checklist 106 may be completed by addressing each of the checklist items 112, 114 . . . N. The checklist items 112, 114 . . . N may be addressed by performing procedures associated with the checklist items 112, 114 . . . N and/or by causing components associated with the checklist items 112, 114 . . . N to be configured in states associated with the checklist items 112, 114 . . . N.

In some examples, the processor 102 may be configured to progress through the checklist items 112, 114 . . . N according to a specified order. For example, a memory (e.g., a non-transitory processor-readable medium 981 of FIG. 9) may store an order indicating that the checklist item 112 is to be addressed first and that the checklist item 114 is to be addressed upon completion of the checklist item 112. In this example, the processor 102 may be configured to progress through the electronic checklist 106 by addressing the checklist item 112 first and addressing the checklist item 114 when the checklist item 112 is completed. Alternatively or additionally, individual checklist items of the electronic checklist 106 may be selectable (e.g., by a user, such as a pilot or operator) to control the order in which the checklist items 112, 114 . . . N are addressed. For example, a user may desire to address the checklist item 114 prior to addressing the checklist item 112. In this example, the user may select (e.g., by providing input at the electronic display 104) the checklist item 114 prior to addressing the checklist item 112.

Thus, an order of progression through the electronic checklist 106 may be based on input (at the electronic display 104) from a user.

In the implementation illustrated in FIG. 1, the checklist item 112 is associated with a state of a single component. For example, the checklist item 112 may correspond to a single switch being configured in a particular position. Additionally, in the implementation illustrated in FIG. 1, the checklist item 114 is associated with states of multiple components. For example, the checklist item 114 may be associated with states of the components 132, 133. For example, the multiple components 132, 133 may include multiple nozzles, and the checklist item 114 may direct that the multiple nozzles be configured in a particular state.

In the illustrated implementation, the processor 102 is configured to cause the electronic display 104 to display a synoptic page 108. Although the synoptic page 108 is illustrated as being displayed on the same electronic display as the electronic checklist 106, in other implementations the synoptic page 108 is displayed on a different electronic display than the electronic display 104 on which the electronic checklist 106 is displayed. Also, in other implementations, the synoptic page 108 may not be displayed concurrently with the electronic checklist 106.

The synoptic page 108 presents component state data (e.g., using state display symbols) describing a state of a component of the subsystem. The synoptic page 108 is additionally configured to present command state data (e.g., on/off, armed/unarmed . . . etc.) of the component. The component state data and the command state data associated with a component may be displayed within a region associated with the component. To illustrate, the components 132, 133 may include a first nozzle (e.g., component 132) and a second nozzle (e.g., component 133). In this example, the component state data includes a symbol 144 (within a region 152) indicating that the first nozzle is off and a second symbol 146 (within a region 154) indicating that the second nozzle is on, and the command state data includes text 140 (within the region 152) indicating that the first nozzle is off and includes text 142 (within the region 154) indicating that the second nozzle is on.

Thus, the synoptic page 108 provides symbols and text indicating a current state of one or more components of a subsystem that are associated with an active electronic checklist 106 in a region of the synoptic page 108 that is associated with the component. The synoptic page 108 thereby presents information regarding a state of a component in a same region that a user may be prone to look when addressing the state of the component. Presenting the state information near the representation of the component may reduce an amount of visual attention needed by a user to determine a state of a component as compared to electronic checklist systems that do not provide state data on the electronic control interface (e.g., on a touchscreen) or that provide the state data in a different region than the representation of the component on the electronic control interface.

In some examples, the processor 102 is configured to highlight or otherwise emphasize regions of the synoptic page 108 or representations of components on the synoptic page 108 that are associated with an active checklist item. For example, when the checklist item 114 is active, the processor 102 may highlight or otherwise emphasize the regions 152 and 154 associated with the components 132 and 133. Emphasizing components that are associated with an active checklist item may reduce an amount of visual attention required from a user (as compared to current electronic checklist systems that employ a touchscreen) by directing the attention of the user to the relevant (active) components on the electronic display 104.

Additionally or alternatively, the processor 102 may be configured to cause borders or lines around physical controls [not illustrated] in the aircraft 100 that are associated with an active checklist item to be emphasized. For example, the borders or lines around the physical controls associated with a checklist item may be illuminated via back lighting when the checklist item is active (and may not be illuminated when the checklist item is inactive).

The synoptic page 108 includes one or more functions (e.g., one or more discrete functions) that are selectable to control a state or configuration of individual components of the subsystem as described in more detail below with reference to FIGS. 2 and 3. The synoptic page 108 may additionally include one or more macro-functions that are associated with one or more checklist items that include direct configuration of components into particular states (e.g., into a same state). The macro-function may be executable or selectable to control states or configurations of multiple components.

To implement the macro-function capability, the processor 102 is configured to determine whether the electronic checklist 106 includes a checklist item associated with states of multiple components of the subsystem associated with the electronic checklist 106. To illustrate, to implement the macro-function capability, the processor 102 is configured to determine whether the electronic checklist 106 includes a checklist item associated with states of the components 132, 133. For example, the checklist item 114 may be associated with the components 132 and 133 being configured in a same state. To illustrate, the component 132 may correspond to a first nozzle and the component 133 may correspond to a second nozzle, and the checklist item 114 may include both the component 132 and the component 133 being configured in an OFF state. Alternatively, the checklist item 114 may include both the component 132 and the component 133 being configured in an ON state. Although the checklist item 114 is described as being associated with two components (e.g., the components 132 and 133) of a subsystem, the checklist item 114 may be associated with more than two components of a subsystem.

To implement the macro-function capability, the processor 102 is further configured to selectively display a single option (that is selectable to configure states of the multiple components) based on determining that the electronic checklist 106 includes a checklist item associated with multiple components. For example, the processor 102 is further configured to, based on determining that the electronic checklist 106 includes the checklist item 114 associated with the states of the components 132 and 133 (e.g., associated with the components 132, 133 being configured in a same state), cause the electronic display 104 to display the single option 118. In some examples, the single option 118 is presented on the synoptic page 108. Alternatively or additionally, in some implementations, the single option 118 is presented within the electronic checklist 106 portion of the electronic display 104.

The single option 118 may be displayed when the checklist item associated with the single option 118 is active (e.g., is the next open checklist item or is selected by a user). For example, the single option 118 may be associated with the checklist item 114, and the processor 102 may be configured to progress through the electronic checklist 106 such that the checklist item 114 is the next open checklist item once the checklist item 112 is performed. In this example, upon determining that the checklist item 114 is the next open checklist item, the processor 102 may cause the single option 118 to be displayed. Alternatively, the single option 118 may be associated with the checklist item 114, and a user may select the checklist item 114 by providing input at the electronic checklist. The processor may cause the single option 118 to be displayed responsive to the user selecting the checklist item.

In some examples, the single option 118 is not displayed when the checklist item associated with the single option 118 is not active (e.g., is not the next open checklist item or is not the selected checklist item). For example, the single option 118 may not be displayed when the next open checklist item or the selected checklist item is the checklist item 112. Alternatively or additionally, the single option 118 may be displayed but may be inactive (e.g., un-selectable) when the checklist item associated with the single option 118 is not the next checklist item or is not the selected checklist item. For example, the single option 118 may be displayed but may be inactive when the next open checklist item or the selected checklist item is the checklist item 112. Thus, the single option 118 may be displayed or may be active only when the checklist item associated with the single option 118 is active.

To implement the macro-function capability, the single option 118 is selectable to send control commands 162, 164 to multiple components (e.g., to the components 132 and 133). In some implementations, the single option 118 is selectable to send the control commands 162, 164 to the components 132 and 133 without additional input at the electronic display 104. For example, selecting the single option 118 may cause the processor 102 to cause the subsystem controller 120 to send the control commands 162, 164 to the components 132 and 133 without presenting a dialog window (e.g., a pop-up window) indicating additional input at the electronic display 104. Thus, the single option 118 may be selectable to send the control commands 162, 164 to the components 132, 133 responsive to selecting the single option 118.

Alternatively or additionally, in some implementations, selecting the single option 118 causes the processor 102 to cause the electronic display 104 to present a dialog window (e.g., a pop-up window), and the processor 102 causes the subsystem controller 120 to send the control commands 162, 164 to the components 132 and 133 responsive to input at the dialog window. In some examples, the dialog window that is presented responsive to selecting the single option 118 includes component state data and command state data indicative of the state of the components 132, 133 as described in more detail below with reference to FIG. 4. In some examples, the dialog window includes an inactive command portion and an active command portion as described in more detail below with reference to FIG. 4. To illustrate, the single option 118 may be associated with a checklist item directing that the components 132, 133 be configured in the OFF state. In this example, the dialog window may display a region corresponding to an OFF command and a region corresponding to an ON command. In this example, the region corresponding to the OFF command may be active (e.g., selectable) while the region corresponding to the ON command may be inactive (e.g., un-selectable). Thus, the dialog window may enable selection of a command state consistent with the state associated with the checklist item and may disable selection capability of a command state that is inconsistent with the state associated with the checklist item. As another example, the inactive command portion and the active command portion may be based on determined states of the components 132, 133 as described in more detail below with reference to FIG. 4.

Thus, the electronic display 104 may include a macro-function that is selectable to control states of multiple components via a single selection (e.g., via a single touch input). The electronic display 104 therefore provides an electronic interactive control interface (e.g., a touchscreen) to individually control a component (e.g., via discrete function capability) or to control multiple components via execution of the macro-function. Using the electronic interactive control interface to control states of components reduces volume, weight, and manufacturing and maintenance costs compared to systems that employ physical control panels. Additionally, because the macro-function capability enables controlling multiple components via a single interaction (e.g., a single touch input at the electronic interactive control interface), the display system 101 enables less interaction between a user and the electronic display (e.g., the touchscreen) to complete a checklist item associated with multiple components as compared to display systems that are limited to controlling a state of a single component per user input (e.g., touch input).

Additionally, in some implementations that employ a dialog window to implement the macro-function capability, one or more functions associated with the single option 118 may be de-selected (e.g., after the dialog window is displayed) as described in more detail below with reference to FIG. 6. In these examples, the processor 102 may be configured to cause an indication of a state of one component (e.g., a de-selected component) of the multiple components 132, 133 to be removed from the dialog window, to disable or bypass a function of the macro-function that is associated with the de-selected component such that input at the dialog window does not result in a control command being sent to the de-selected component (e.g., to disable control of the de-selected component via the dialog window), or both. For example, the de-selected component may correspond to the component 133, and de-selection of the component 133 as described below in more detail with reference to FIG. 6 may result in the processor 102 not instructing the subsystem controller 120 to send the control command 164, thereby resulting in the control command 164 not being sent. Thus, control of the de-selected component via the dialog window may be disabled responsive to input at the synoptic page 108 after the dialog window is displayed. A function of the macro-function that is associated with a de-selected component (e.g., the component 133) of the components 132, 133 may therefore be disabled or bypassed such that selecting the single option 118 does not result in the control command 164 being sent to the de-selected component. The display system 101 (e.g., the processor 102) is thereby, in some implementations, configurable to cause the subsystem controller 120 to send, based on user input associated with the single option 118, one or more control commands to a subset of components (e.g., to some but not all components) of the subsystem that are associated with the single option 118 based on de-selection of one or more of the components of the subsystem.

Figure 2:
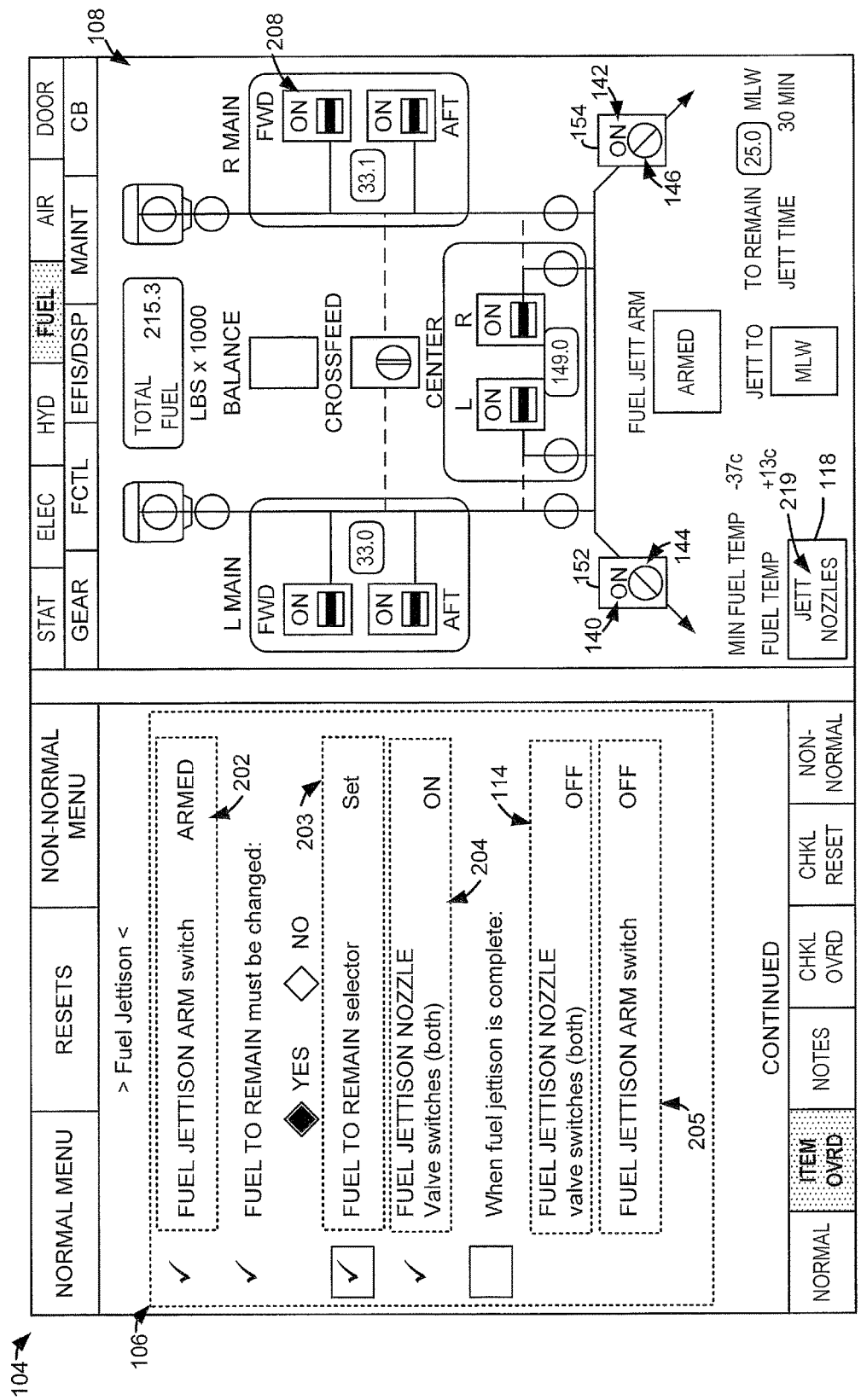
FIG. 2 illustrates an example of the display of FIG. 1 displaying an example of the electronic checklist, the synoptic page, and the single option of FIG. 1.

FIG. 2 illustrates an example of an electronic display 104 that includes (e.g., presents or displays) an electronic checklist 106 and a synoptic page 108 and that includes discrete function capability and macro-function capability. In this example, the electronic checklist 106 and the synoptic page 108 are associated with a fuel subsystem. The fuel subsystem includes multiple components, such as the components 132, 133 of FIG. 1. For example, the components 132, 133 may correspond to multiple fuel jettison nozzles. In this example, the electronic checklist 106 includes checklist items associated with a fuel jettison procedure. For example, the electronic checklist 106 includes checklist item 202 associated with a fuel jettison arm switch being armed, checklist item 203 associated with a fuel to remain selector being set, checklist item 204 associated with the components 132, 133 being configured in an ON state, checklist item 114 associated with the components 132, 133 being configured in an OFF state, and checklist item 205 associated with the fuel jettison arm switch being configured in an OFF state. Thus, the electronic checklist 106 includes the checklist item 204 associated with states of multiple components and includes the checklist item 114 associated with states of multiple components.

The electronic display 104 and the processor 102 may be configured to implement a discrete function capability via input at the synoptic page 108 at a region corresponding to a single component. For example, the region 208 may include a symbol representing a state of a single switch [not illustrated]. The processor 102 may be configured to perform or initiate a function to control a state of the single switch responsive to input at the region 208. To illustrate, the processor 102 may be configured to detect input at the region 208. In response to the input at the region 208, the processor 102 may initiate changing a state of the single switch. For example, the single switch may initially be in an ON state and the processor 102 may detect input at the region 208. Responsive to input at the region 208, the processor 102 may send a signal to a subsystem controller 120 indicating that the single switch is to be configured in an OFF state. The subsystem controller 120 may send a control command to the single switch to cause the single switch to be configured in the OFF state. Additionally or alternatively, the processor 102 may initiate changing a state of the single switch responsive to input at the region 208 by causing a dialog window to be displayed and sending a signal to the subsystem controller 120 responsive to input at the dialog window as described in more detail below with reference to FIG. 3. Thus, the processor 102 of FIG. 1 and the electronic display 104 of FIG. 2 are configured to include or incorporate discrete function capability to control a state of a single component (e.g., as opposed to multiple components) based on input at the synoptic page 108 at a region of the synoptic page 108 that is associated with the single component.

The electronic display 104 and the processor 102 are further configured to implement macro-function capability. To implement the macro-function capability, the processor 102 of FIG. 1 may determine whether the electronic checklist 106 includes at least one checklist item associated with multiple components. For example, the processor 102 of FIG. 1 may determine that the electronic checklist 106 includes the checklist item 204 associated with the components 132 and 133 and includes the checklist item 114 associated with the components 132 and 133. In some implementations, the processor 102 may determine whether the electronic checklist 106 includes at least one checklist item associated with multiple components based on data in the electronic checklist 106 indicating that particular items are associated with multiple components. Based on determining that (e.g., when) the electronic checklist 106 includes at least one checklist item (e.g., the checklist item 204 or the checklist item 114) that is associated with states of multiple components (e.g., with multiple components being configured in a same state), the processor 102 may cause the electronic display 104 to display the single option 118. The single option 118 is associated with only a single checklist item at any given time, but may be associated with multiple checklist items during the course of completing the electronic checklist 106. For example, the single option 118 may be associated with the checklist item 204 when the checklist item 204 is active (e.g., is the next open checklist item or is the selected checklist item), and the single option 118 may be associated with the checklist item 114 when the checklist item 114 is active.

In some examples, the single option 118 includes descriptive text 219 indicative of (e.g., describing) the components associated with an active checklist item that directs that multiple components be configured in particular states. For example, when the checklist item 114 is active and the components 132 and 133 correspond to fuel jettison nozzles, the descriptive text 219 is indicative of (e.g., describes) the fuel jettison nozzles. The processor 102 may be configured to change the descriptive text 219 as the processor 102 progresses through the electronic checklist 106. For example, the checklist item 204 may be associated with different components than the components associated with the checklist item 114, and the descriptive text 219 when the checklist item 204 is active may be indicative of the different components and may be different than the descriptive text 219 when the checklist item 114 is active.

The processor 102 may cause the electronic display 104 to display the single option 118 on the electronic display 104 when a checklist item associated with the single option 118 is active. For example, upon completion of the fuel to remain selection procedure corresponding to the checklist item 203, the checklist item 204 may be the next open checklist item based on an automated progression through the electronic checklist 106. Upon determining that the checklist item 204 is the next open checklist item, the processor 102 may cause the single option 118 associated with the checklist item 204 to be displayed. Alternatively, the checklist item 204 may be selected by a user by providing input at the electronic display 104. The processor 102 may cause the single option 118 associated with the checklist item 204 to be displayed responsive to the user selecting the checklist item 204.

As another example, upon completion of the fuel jettison procedure corresponding to the checklist item 204, the checklist item 114 may be the next open checklist item based on an automated progression through the electronic checklist 106. Upon determining that the checklist item 114 is the next open checklist item, the processor 102 may cause the single option 118 associated with the checklist item 114 to be displayed. Alternatively, the checklist item 114 may be selected by a user by providing input at the electronic display 104. The processor 102 may cause the single option 118 associated with the checklist item 114 to be displayed responsive to the user selecting the checklist item 114.

In some examples, the single option 118 is not displayed when a checklist item associated with multiple components is not active (e.g., is not the next open checklist item or is not the selected checklist item). For example, the single option 118 may not be displayed when the next open checklist item or the selected checklist item is the checklist item 203. Alternatively or additionally, the single option 118 may be displayed but may be inactive (e.g., un-selectable) when a checklist item associated with multiple components is not active. For example, the single option 118 may be displayed but may be inactive when the next open checklist item or the selected checklist item is the checklist item 203. Thus, the single option 118 may be displayed or may be active only when a checklist item associated with multiple components is the current checklist item.

Although the single option 118 is illustrated as being displayed on the synoptic page 108, in other examples, the single option 118 may be displayed within the electronic checklist 106. For example, the single option 118 may be selectable to configure both of the components 132, 133 in the on state, and the single option 118 may be displayed proximate to (e.g., on a same line as) the checklist item 204. Alternatively, the single option 118 may be selectable to configure both of the components 132, 133 in the OFF state, and the single option 118 may be displayed proximate to (e.g., on the same line as) the checklist item 114.

The single option 118 is selectable to send the control commands 162, 164 of FIG. 1 to the components 132, 133 (e.g., to multiple components of the subsystem). For example, the single option 118 is selectable to send the control commands 162, 164 to the components 132, 133 to cause the components 132, 133 to be configured according to the states indicated by or associated with the checklist item 204 when the checklist item 204 is active (e.g., is the next open checklist item or is the selected checklist item). As another example, the single option 118 is selectable to send the control commands 162, 164 to the components 132, 133 to cause the components 132, 133 to be configured according to the states indicated or associated with the checklist item 114 when the checklist item 114 is active.

In some implementations, the single option 118 is selectable to send the control commands 162, 164 to the components 132 and 133 directly responsive to selection of the single option 118 (e.g., without additional input at the electronic display 104). For example, selecting the single option 118 may cause the processor 102 to cause the subsystem controller 120 to send the control commands 162, 164 to the components 132 and 133 without presenting a dialog window (e.g., a pop-up window) indicating additional input at the electronic display 104.

To illustrate, the next open checklist item or the selected checklist item may correspond to the checklist item 204 (e.g., based on an automated progression through the electronic checklist 106 or based on input from the user) and the processor 102 may display the single option 118 associated with the checklist item 204. A user may select the single option 118. For example, the electronic display 104 may be a touchscreen display and the user may provide touch input at a region of the electronic display 104 corresponding to the single option 118. The processor 102 may detect selection of the single option 118, and may send a signal (e.g., instruction) to the subsystem controller 120 indicating that the components 132, 133 are to be configured in the ON state. In response to receiving the signal from the processor 102, the subsystem controller 120 may send the control commands 162, 164 (e.g., multiple control commands) to the components 132, 133 to cause each of the components 132, 133 to be configured in the ON state. As another example, the next open checklist item or the selected checklist item may correspond to the checklist item 114 (e.g., based on an automated progression through the electronic checklist 106 or based on input from the user) and the processor 102 may display the single option 118 associated with the checklist item 114. A user may select the single option 118 (e.g., via touch input as described above). The processor 102 may detect selection of the single option 118, and may send a signal (e.g., instruction) to the subsystem controller 120 indicating that the components 132, 133 are to be configured in the OFF state. In response to receiving the signal from the processor 102, the subsystem controller 120 may send the control commands 162, 164 to the components 132, 133 to cause each of the components 132, 133 to be configured in the OFF state.

Thus, the single option 118 may be selectable (e.g., via touch input) to send the control commands 162, 164 to the multiple components 132, 133 responsive to selecting the single option 118. Alternatively or additionally, in some implementations, the single option 118 is selectable to send the control commands 162, 164 to the components 132, 133 indirectly responsive to selection of the single option 118. For example, the single option 118 may be selectable to send the control commands 162, 164 to the components 132, 133 based on (e.g., responsive to) input at a dialog window that is displayed responsive to selecting the single option 118 as described in more detail above with reference to FIG. 1 and below with reference to FIG. 4.

Figure 3:
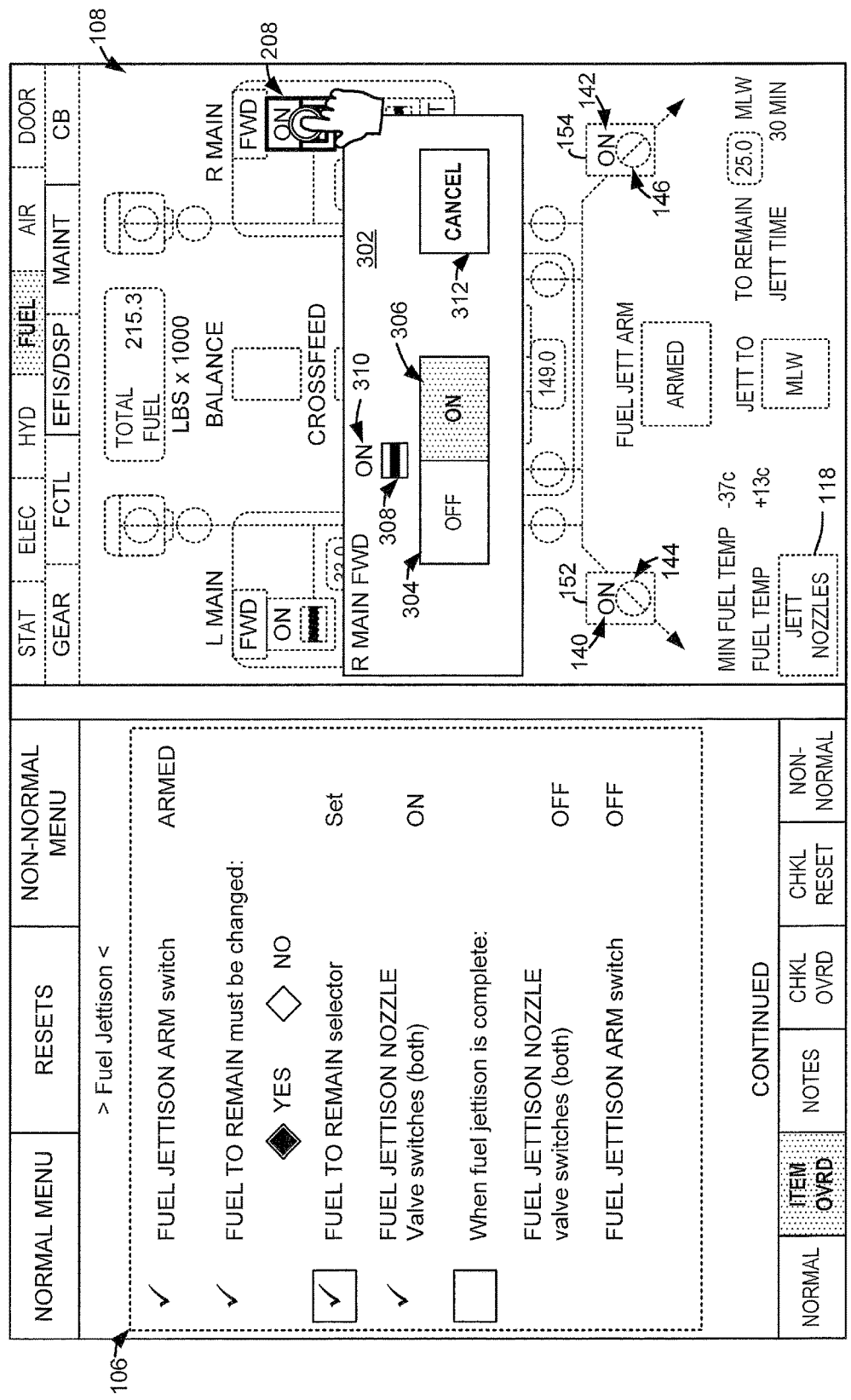
FIG. 3 illustrates an example of the display of FIG. 2 displaying the electronic checklist, the synoptic page, and the single option of FIG. 2, and displaying a dialog window during execution of a discrete function.

FIG. 3 illustrates an example of the electronic display 104 of FIG. 2 during execution of a discrete function. The electronic display 104 includes a dialog window (e.g., a pop-up window) 302 that is displayed responsive to input at the region 208 associated with a single switch (e.g., a right main forward switch). Responsive to input at the region 208, portions of the synoptic page 108 other than the region 208 may be de-emphasized (e.g., grayed out) to emphasize the region 208. The pop-up window 302 includes a symbolic representation 308 of the single switch associated with the region 208 and includes text 310 indicative of a current state of the single switch associated with the region 208. The pop-up window 302 also displays multiple command instruction blocks. For example, the pop-up window 302 displays an OFF command instruction block 304, an ON command instruction block 306, and a CANCEL command instruction block 312.

In some examples, the command instruction block corresponding to the current state of the corresponding switch or component may be inactive (e.g., un-selectable). For example, because the region 208 (e.g., state data in the region 208) indicates that the single switch is in the ON state, the ON command instruction block 306 may be inactive. In this example, the OFF command instruction block 304 may be active (e.g., selectable) to cause the single switch associated with the region 208 to be configured in the OFF state. To illustrate, the pop-up window 302 may be displayed responsive to input at the region 208. A user may select the OFF command instruction block 304. The processor 102 may detect selection of the OFF command instruction block 304, and may send a signal (e.g., an instruction) to the subsystem controller 120 indicating that the single switch associated with the region 208 be configured in the OFF state. The subsystem controller 120 may send a control command to the single switch associated with the region 208 to cause the single switch to be configured in the OFF state.

Thus, the region 208 is selectable to control the single switch associated with the region 208. The synoptic page 108 therefore includes or incorporates discrete function capability by including at least one portion or region that is selectable to control a single component.

Figure 4:
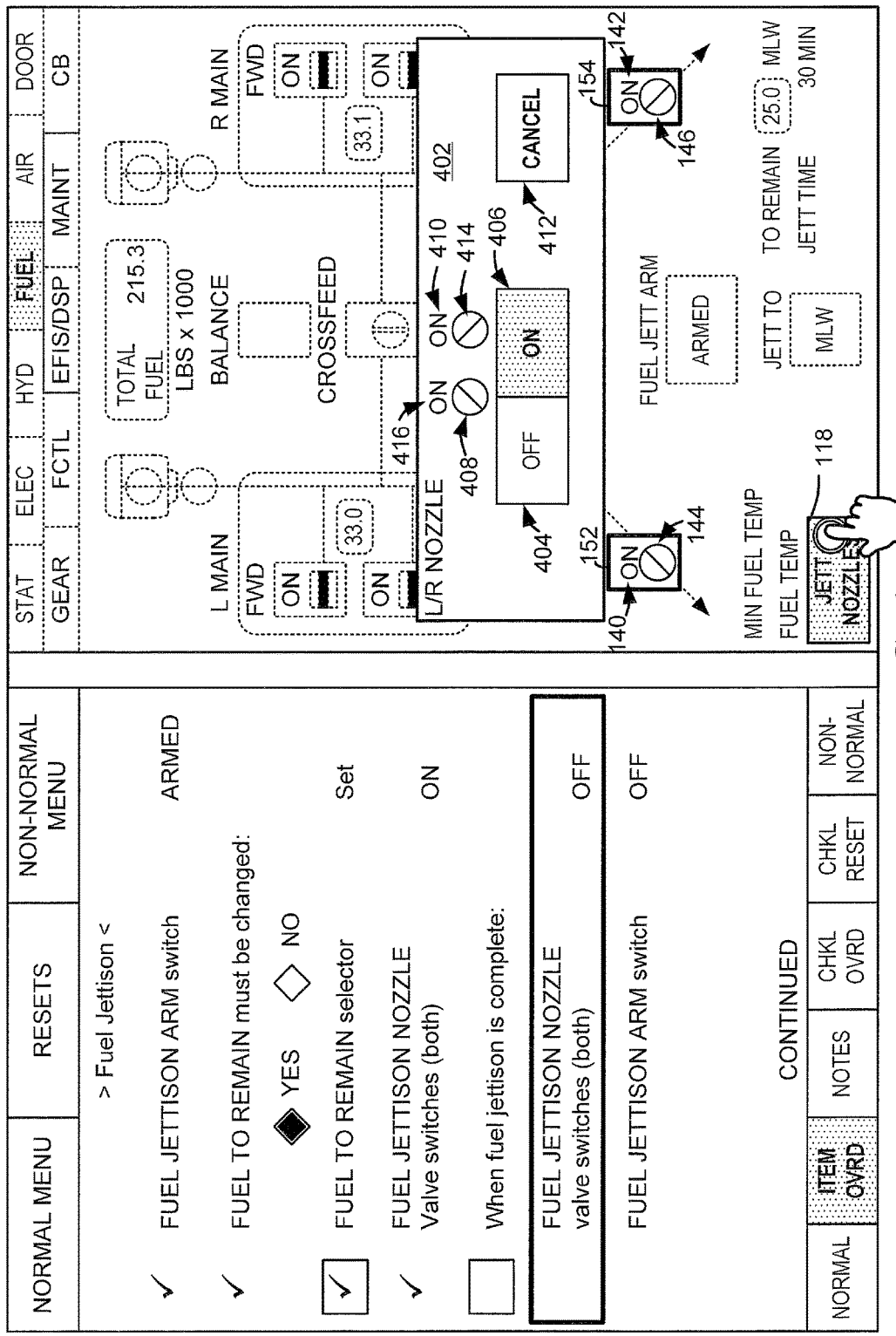
FIG. 4 illustrates an example of the display of FIG. 2 displaying the electronic checklist, the synoptic page, and the single option of FIG. 2, and displaying a dialog window during execution of a macro-function.

FIG. 4 illustrates an example of the electronic display 104 of FIG. 2 during execution of a macro-function. The electronic display 104 displays a pop-up window 402 responsive to input at the single option 118. Responsive to input at the single option 118, portions of the synoptic page 108 other than the single option 118 may be de-emphasized (e.g., grayed out) to emphasize the single option 118. The pop-up window 402 includes symbolic representations 408 and 414 of the multiple components 132, 133. The pop-up window 402 also displays multiple command instruction blocks. For example, the pop-up window 402 displays an OFF command instruction block 404, an ON command instruction block 406, and a CANCEL command instruction block 412.

In some examples, contents or functionality of the pop-up window 402 depends on determined states of the multiple components. For example, when the multiple components are determined to be in the same state, the command instruction block corresponding to the determined state of the corresponding switch or component may be inactive (e.g., un-selectable). For example, the processor 102 may determine that the components 132 and 133 are in the ON state. In this example, the ON command instruction block 406 may be inactive (e.g., un-selectable) based on the processor 102 determining that the components 132 and 133 are both in the ON state.

Alternatively or additionally, when the components 132 and 133 are determined to be in different states, the command instruction blocks corresponding to both states are active. For example, the processor 102 may determine that the component 132 is in the ON state and the component 133 is in the OFF state. In this example, the OFF command instruction block 404 and the ON command instruction block 406 may both be active, and the processor 102 may be configured to cause the subsystem controller 120 to send control commands to the components that are not in the selected state. To illustrate, when a user selects the OFF command instruction block 404 in the example above, the processor 102 may send a signal to the subsystem controller 120 indicating that the component 132 is to be configured in the OFF state, thereby causing the subsystem controller 120 to send a control command to the component 132 to configure the component 132 in the OFF state. Alternatively or additionally, the processor 102 may be configured to cause the subsystem controller 120 to send control commands to all of the components associated with the single option 118 regardless of a current state of the component. For example, when a user selects the OFF command instruction block 404 in the example above, the processor 102 may send a signal to the subsystem controller 120 indicating that the components 132, 133 are to be configured in the OFF state, thereby causing the subsystem controller 120 to send a control command to the components 132, 133 to configure the components 132, 133 in the OFF state.

Additionally or alternatively, the command instruction block corresponding to a state other than the state associated with the active checklist item may be inactive (e.g., un-selectable). For example, the active checklist item may be the checklist item 114 and the components 132 and 133 may both be in the ON state. In this example, the ON command instruction block 406 may be inactive. In this example, the OFF command instruction block 404 may be active (e.g., selectable) to cause the components 132 and 133 to be configured in the OFF state. To illustrate, the pop-up window 402 may be displayed responsive to input (e.g., touch input) at the single option 118. A user may select the OFF command instruction block 404 (e.g., by providing touch input). The processor 102 may detect selection of the OFF command instruction block 404, and may send a signal (e.g., an instruction) to the subsystem controller 120 indicating that the components 132 and 133 are to be configured in the OFF state. The subsystem controller 120 may send commands to the components 132 and 133 to cause the components 132 and 133 to be configured in the OFF state.

Thus, a pop-up window 402 may be displayed responsive to selection of the single option 118. A single command instruction block of the pop-up window 402 may be selected to send commands to multiple components (e.g., to the components 132 and 133) to control a state of the multiple components.

Figure 5:
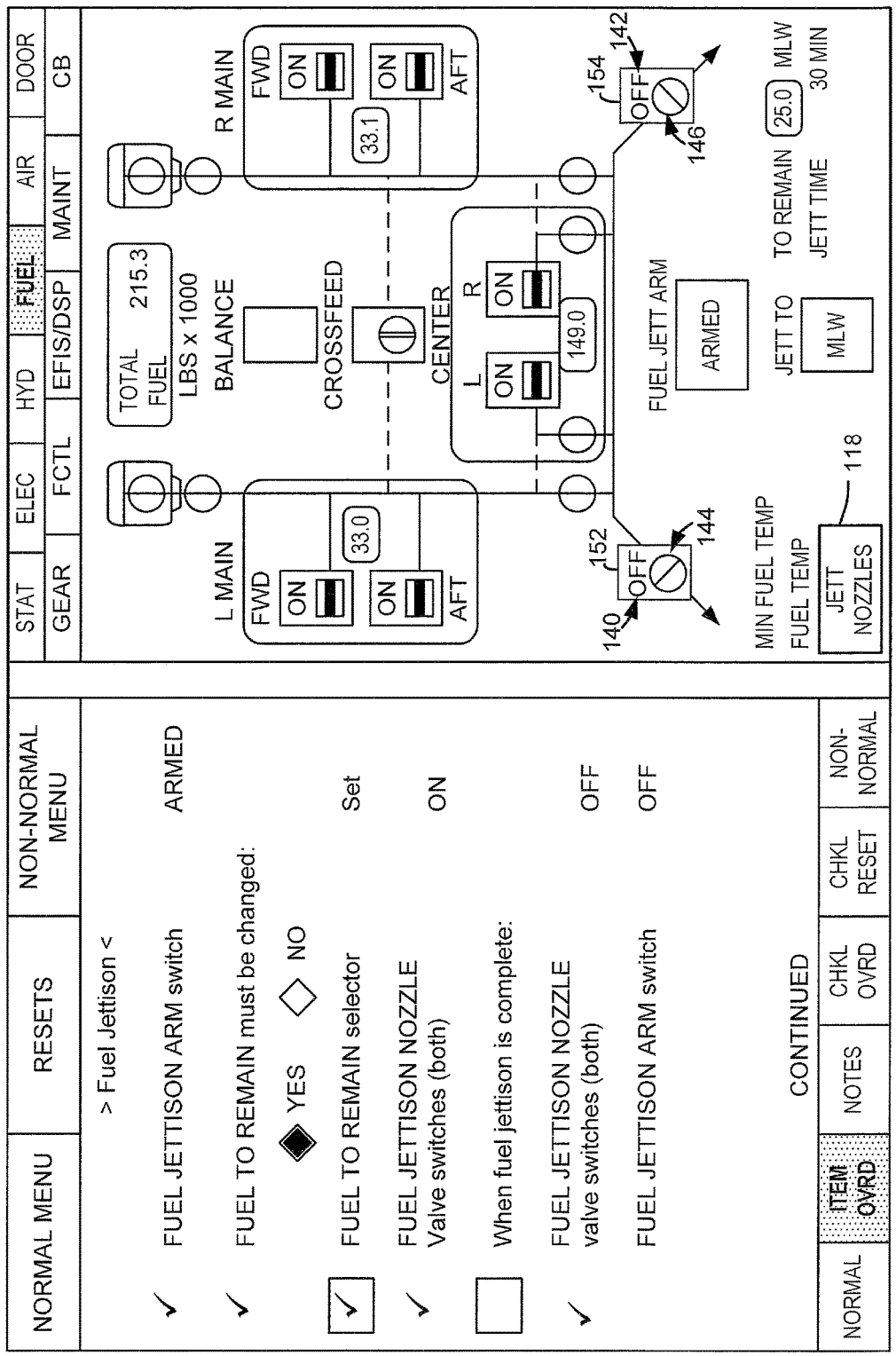
FIG. 5 illustrates an example of the display of FIG. 2 subsequent to executing the macro-function to set multiple components to a same state.

FIG. 5 illustrates an example of the electronic display 104 of FIG. 2 subsequent to selection of the OFF command instruction block 404 of FIG. 4. Responsive to selection of the OFF command instruction block 404 of FIG. 4, the components 132, 133 may be configured in the OFF state (e.g., may be changed from the ON state to the OFF state). The processor 102 may detect, or receive an indication, that the components 132, 133 are configured in the OFF state, and may cause the synoptic page 108 to adjust the component state data and the command state data corresponding to the multiple components to indicate the detected state of the multiple components. For example, responsive to detecting, or receiving an indication, that the components 132, 133 are in the OFF state, the processor 102 may cause the text (e.g., the command state data) 140, 142 associated with the components 132, 133 to read 'OFF' and may cause the symbols (e.g., the component state data) 144, 146 associated with the components 132, 133 to symbolically indicate that the components 132, 133 are configured in the OFF state.

Upon completion of an active checklist item, the processor 102 may cause the electronic checklist 106 to indicate completion of the completed checklist item and may move to a next open checklist item. For example, upon completion of the checklist item 114, the processor 102 may cause the electronic checklist 106 to display an indication (e.g., a mark, such as a check mark) proximate to (e.g., on a same line as) the checklist item 114. In this example, upon completion of the checklist item 114, the processor 102 may move to the checklist item 205. For example, upon completion of the checklist item 114, the processor 102 may emphasize the checklist item 205 on the electronic display 104 and may determine whether the checklist item 205 is associated with multiple components. In this example, the checklist item 205 is not associated with multiple components, thereby resulting in the processor either not displaying the single option 118 or rendering the single option 118 inactive (e.g., un-selectable).

Figure 6:
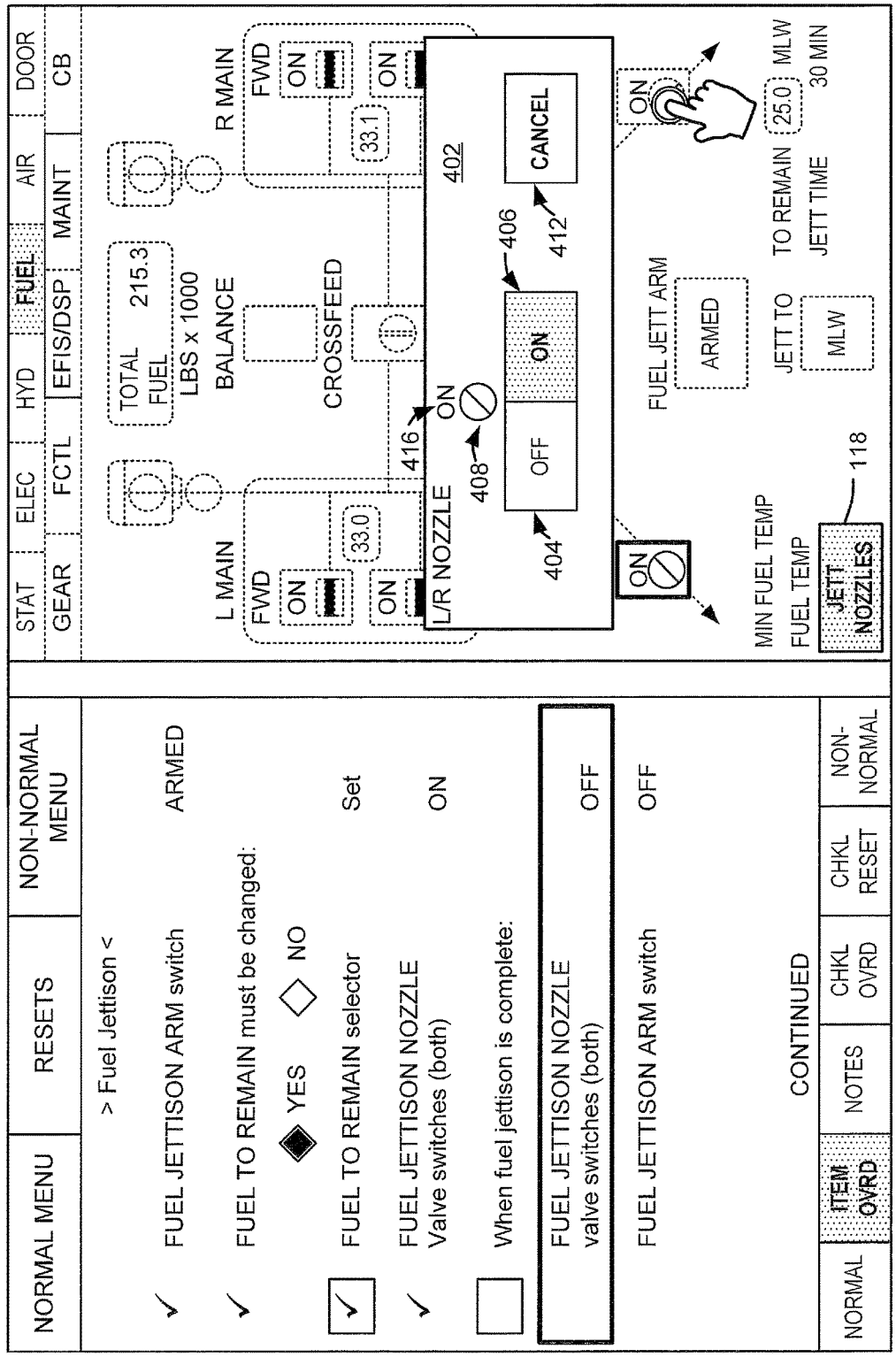
FIG. 6 illustrates an example of the display of FIG. 4 with the dialog window of FIG. 4 modified responsive to de-selecting a component of the multiple components.

FIG. 6 illustrates an example of the electronic display 104 of FIG. 2 after de-selection of a function of the macro-function that is associated with the checklist item 114. The electronic display 104 includes the pop-up window 402 of FIG. 4 modified based on input on the synoptic page 108. In this example, based on input at the synoptic page 108 subsequent to displaying the pop-up window 402 of FIG. 4, the processor 102 causes an indication of a state of one component (e.g., a de-selected component) of the components 132, 133 to be removed from the pop-up window 402 and the processor 102 dis-associates the command instruction block in the pop-up window 402 and the de-selected component, thereby bypassing or disabling a function of the macro-function that is associated with the de-selected component (e.g., thereby disabling control of the de-selected component via the pop-up window 402).

In this example, the indication of the state of the de-selected component is removed after the pop-up window 402 is displayed. For example, the pop-up window 402 of FIG. 4 may be displayed to include the state data 408, 416 associated with the component 132 and the state data 414, 410 associated with the component 133 as described above with reference to FIG. 4. While the pop-up window 402 of FIG. 4 is displayed, the command instruction block 404 is associated with the component 132 and the component 133 such that selection of the command instruction block 404 causes both the component 132 and the component 133 to be configured in the OFF state as described above with reference to FIG. 4. While the pop-up window 402 of FIG. 4 is displayed, a user may provide input at the region 154 of the synoptic page 108 corresponding to the component 133 (e.g., a de-selected component). In response to the input at the region 154, the processor 102 may remove the component state data 414 and the command state data 410 corresponding to the de-selected component 133 from the pop-up window 402. Additionally or alternatively, the processor 102 may, in response to the input at the region 154, disable or bypass the function (of the macro-function) that is associated with the de-selected component 133 such that input at the pop-up window 402 does not control a state of the component 133.

For example, after the pop-up window 402 of FIG. 4 is displayed, a user may provide input (e.g., touch input) at the region 154 of the synoptic page 108 corresponding to the component 133 (e.g., a de-selected component). In this example, the user may then select (e.g., via touch input) the OFF command instruction block 404 on the pop-up window 402. The processor 102 may, responsive to selection of the OFF command instruction block 404, send a signal (e.g., an instruction) to the subsystem controller 120 indicating that the component 132 is to be configured in the OFF state. The signal may not indicate that the component 133 is to be configured in the OFF state. The subsystem controller 120 may, responsive to the signal from the processor 102, send a command to the component 132 to cause the component 132 to be configured in the OFF state and may not send a command to the component 133. Thus, the component 132 is turned off responsive to selection of the OFF command instruction block 404 and the component 133 is not turned off responsive to selection of the OFF command instruction block 404.

Thus, the processor 102 is configured to remove state data from the pop-up window responsive to input at a particular portion of the synoptic page corresponding to a component (e.g., a de-selected component) of the multiple components. The processor is additionally configured to bypass or disable one or more functions of a macro-function that are associated with the de-selected component such that the subsystem controller 120 does not send a command instruction to the de-selected component responsive to selection of a command instruction block on the pop-up window. Thus, the macro-function is configurable via input at the synoptic page 108 to de-select one or more functions of the macro-function.

Figure 7:
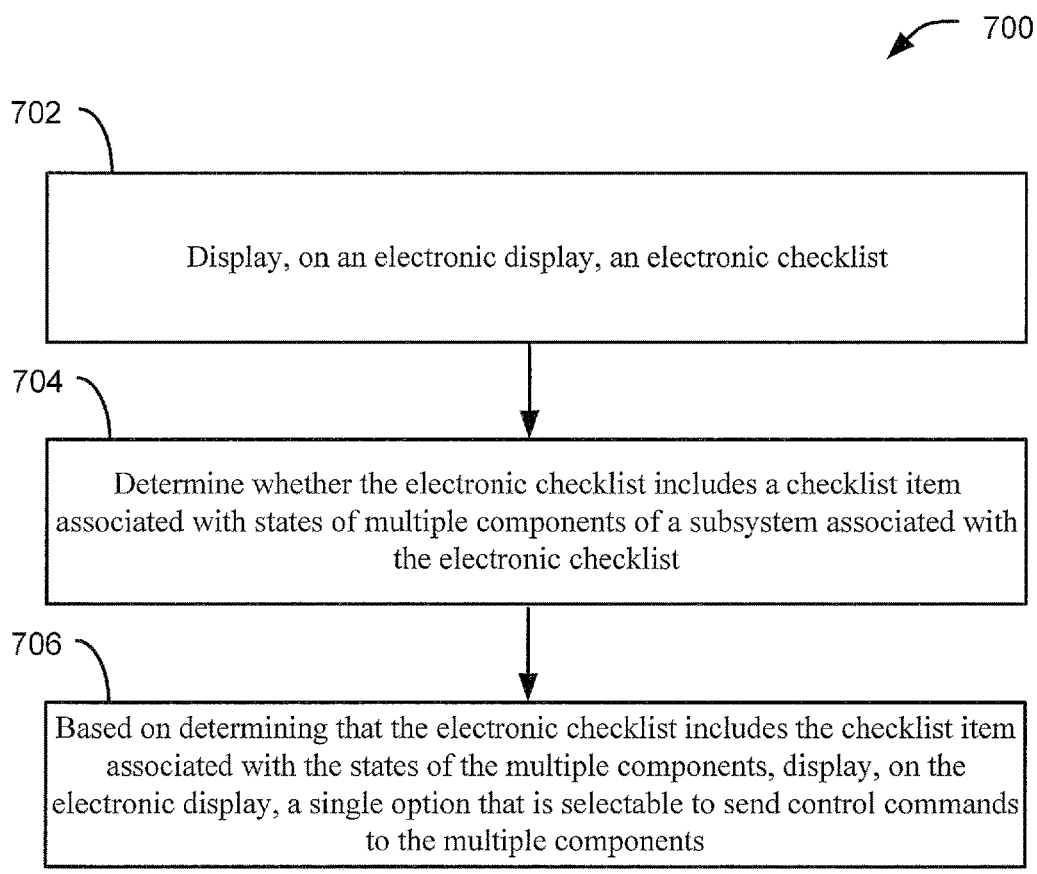
FIG. 7 illustrates a method of providing a synoptic panel including macro-function capability.

FIG. 7 illustrates a method 700 of providing a synoptic panel including macro-function capability. The method 700 of FIG. 7 may be performed by the display system 101 of FIG. 1.

The method 700 includes, at 702, displaying, on an electronic display, an electronic checklist. The electronic display may correspond to the electronic display 104 of FIGS. 1-6 and the electronic checklist may correspond to the electronic checklist 106 of FIGS. 1-6.

The method 700 includes, at 704, determining whether the electronic checklist includes a checklist item associated with states of multiple components of a subsystem associated with the electronic checklist. The multiple components may correspond to the multiple components 132 and 133 of FIG. 1, the checklist item may correspond to the checklist item 114 of FIGS. 1-6 and/or the checklist item 204 of FIGS. 2-6, and the processor 102 of FIG. 1 may determine whether the electronic checklist includes the checklist item 114 or the checklist item 204 as described above with reference to FIGS. 1 and 2.

The method 700 includes, at 706, based on determining that the electronic checklist includes the checklist item associated with the states of the multiple components, displaying, on the electronic display, a single option that is selectable to send control commands to the multiple components. The single option 118 may correspond to the single option 118 of FIGS. 1-6. The single option may be displayed on the electronic display as described above with reference to FIGS. 1 and 2. For example, the single option may be displayed only when a corresponding checklist item associated with multiple components is active as described above with reference to FIGS. 1 and 2. Additionally or alternatively, the single option may be displayed on the synoptic page or within the electronic checklist as described above with reference to FIGS. 1 and 2.

In some implementations, the method 700 of FIG. 7 further includes displaying a synoptic page on the electronic display. The synoptic page may correspond to the synoptic page 108 described above with reference to FIGS. 1-6.

In some implementations, the method 700 of FIG. 7 further includes sending the control commands to the multiple components responsive to selection of the single option. For example, the processor 102 of FIG. 1 may detect selection of the single option 118 of FIGS. 1-6, may send a signal to the subsystem controller 120 indicating a particular state for the multiple components, and the subsystem controller 120 may send multiple control commands (e.g., the control commands 162, 164) to the multiple components (e.g., the components 132, 133) as described above with reference to FIGS. 1 and 2.

In some implementations, the method 700 of FIG. 7 further includes displaying, on the electronic display, a pop-up window responsive to selection of the single option as described above with reference to the pop-up window 402 of FIG. 4. Contents of the pop-up window may depend on determined states of the multiple components as described above with reference to FIG. 4.

In some implementations, the method 700 of FIG. 7 further includes removing, from the pop-up window, an indication of a state for one component of the multiple components, disabling control of the one component via the pop-up window, or both, as described above with reference to FIGS. 1 and 6. In some implementations, the indication is removed and control of the one component via the pop-up window is disabled responsive to input at the synoptic page after the pop-up window is displayed as described above with reference to FIG. 6. In some implementations, the input is provided at a portion of the synoptic page associated with a representation of the one component as described above with reference to the region 154 of FIG. 6.

In some implementations, the method 700 of FIG. 7 further includes highlighting or otherwise emphasizing regions of the synoptic page 108 or representations of components on the synoptic page 108 that are associated with an active checklist item. For example, when the checklist item 114 is active, the processor 102 may highlight or otherwise emphasize the regions 152 and 154 associated with the components 132 and 133. Additionally or alternatively, in some implementations, the method 700 of FIG. 7 further includes emphasizing borders or lines around physical controls [not illustrated] in the aircraft 100 that are associated with an active checklist item. For example, the borders or lines around the physical controls associated with a checklist item may be illuminated via back lighting when the checklist item is active (and may not be illuminated when the checklist item is inactive).

Figure 8:
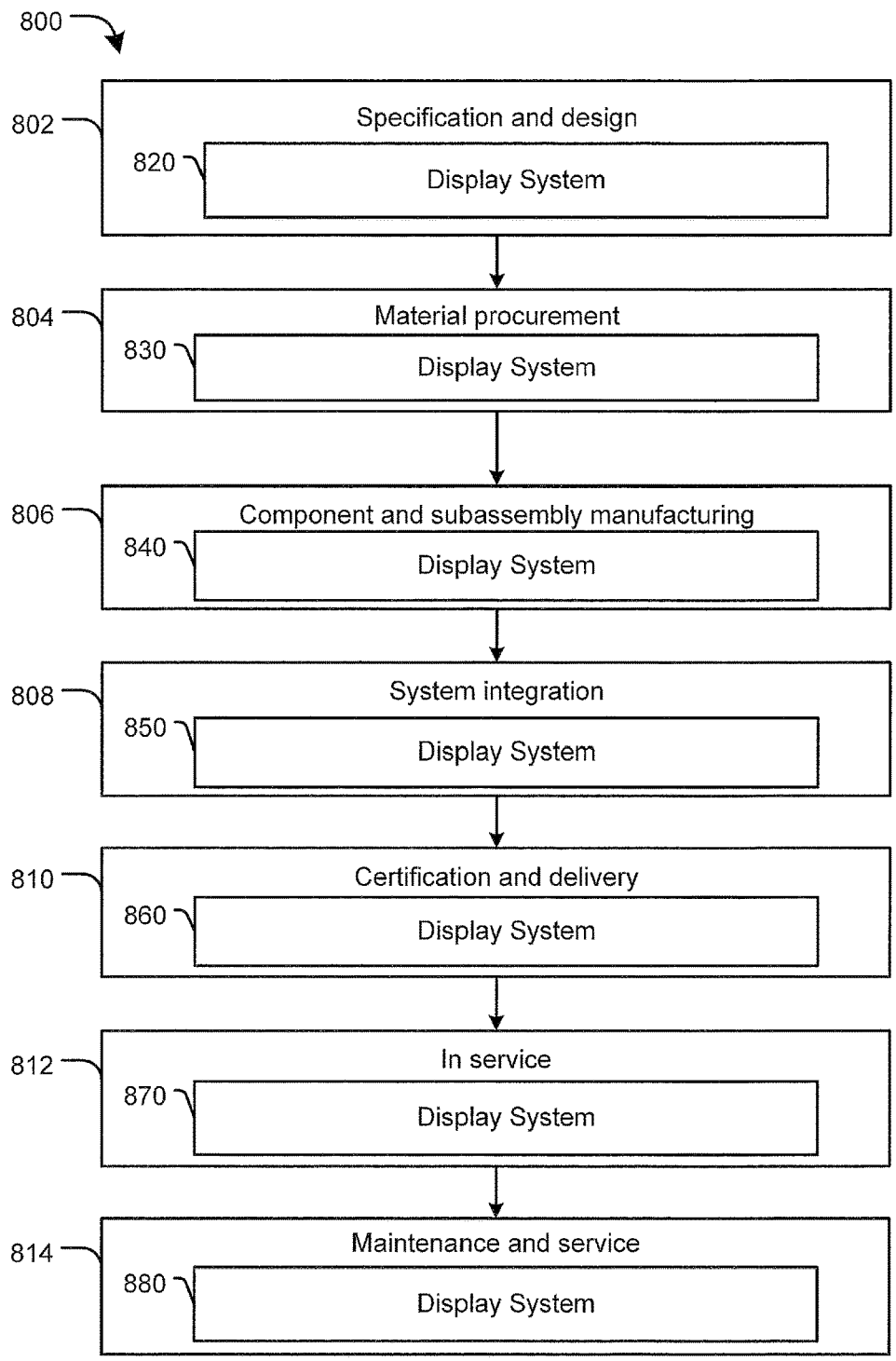
FIG. 8 is a flow chart illustrative of a life cycle of an aircraft that includes the display system of FIG. 1.

Referring to FIG. 8, a flowchart illustrative of a life cycle of an aircraft including a display system configured with macro-function capability is illustrated. During pre-production, the exemplary method 800 includes, at 802, specification and design of an aircraft, such as the aircraft 100 of FIG. 1. During specification and design of the aircraft, the method 800 may include, at 820, specification and design of a display system. The display system may correspond to the display system 101 of FIG. 1 (as described with reference to FIGS. 1-6). At 804, the method 800 includes material procurement. At 830, the method 800 includes procuring materials for the display system.

During production, the method 800 includes, at 806, component and subassembly manufacturing and, at 808, system integration of the platform. The method 800 may include, at 840, component and subassembly manufacturing (e.g., producing the electronic display) and, at 850, system integration of the display system. For example, the display system may be mounted in the aircraft. At 810, the method 800 includes certification and delivery of the aircraft and, at 812, placing the aircraft in service. Certification and delivery may include, at 860, certifying the display system. At 870, the method 800 includes placing the aircraft in service. While in service by a customer, the aircraft may be scheduled for routine maintenance and service (which may also include modification, reconfiguration, refurbishment, and so on). At 814, the method 800 includes performing maintenance and service on the aircraft. At 880, the method 800 includes performing maintenance and service of the display system. For example, maintenance and service of the weapon and the control system may include replacing one or more components of the electronic display of the display system.

Each of the processes of the method 800 may be performed or carried out by a system integrator, a third party, and/or an operator (e.g., a customer). For the purposes of this description, a system integrator may include without limitation any number of manufacturers and major-system subcontractors; a third party may include without limitation any number of venders, subcontractors, and suppliers; and an operator may be an airline, a leasing company, a military entity, a service organization, and so on.

Figure 9:
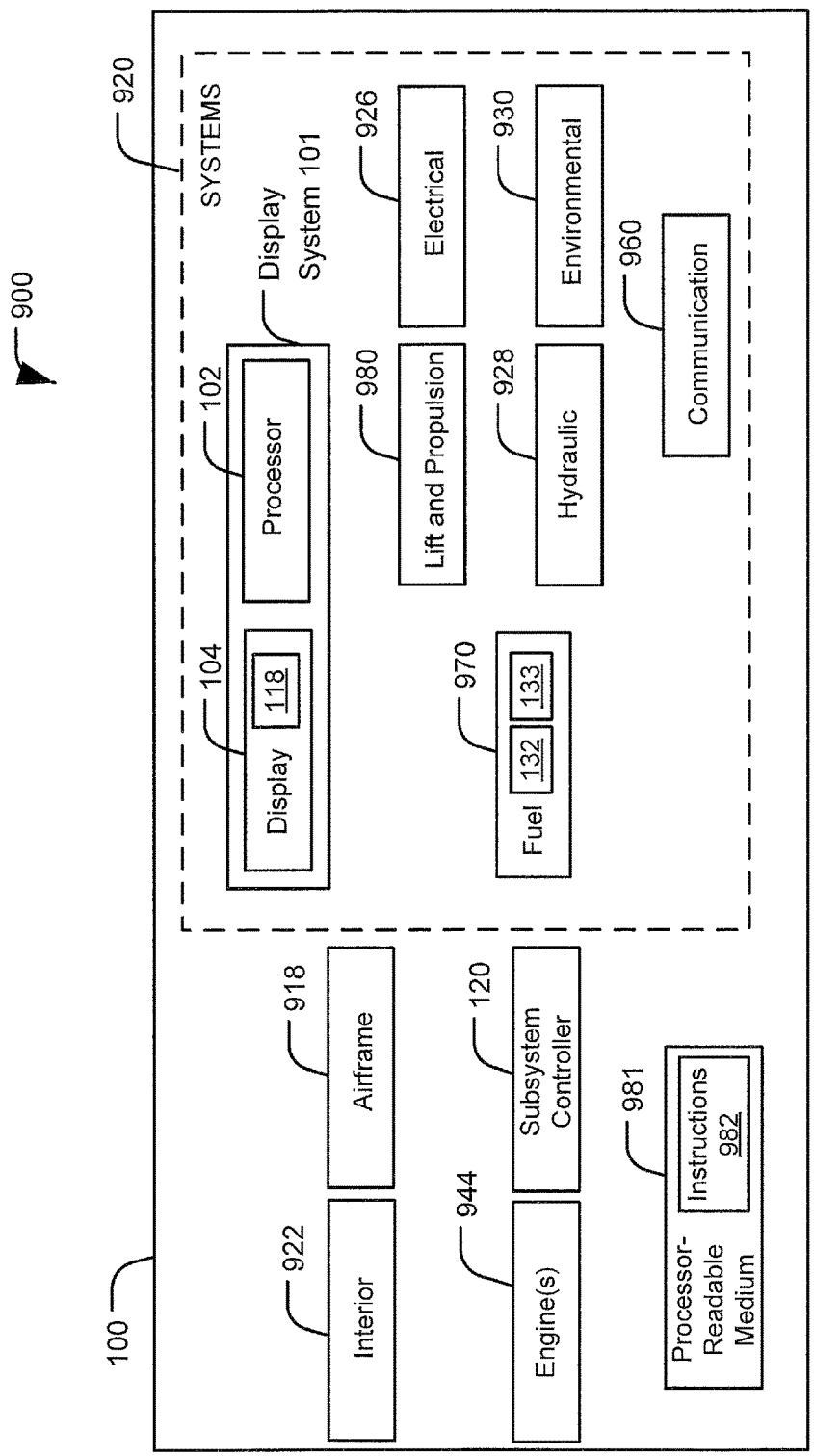
FIG. 9 is a block diagram of an illustrative embodiment of an aircraft that includes the display system of FIG. 1.

Referring to FIG. 9, a block diagram of an illustrative embodiment of an aircraft 100 that includes a display system 101 configured with macro-function capability is displayed. As shown in FIG. 9, the aircraft may include an airframe 918, an interior 922, one or more engines 944, a subsystem controller 120, a non-transitory processor-readable medium 981 storing instructions 982, and a plurality of systems 920. The systems 920 may include one or more of a lift and propulsion system 980, an electrical system 926, a hydraulic system 928, an environmental system 930, a display system 101 that includes a processor 102 and an electronic display 104, a communication system 960, and a fuel system 970 that includes components 132 and 133. Any number of other systems may be included. The one or more engines 944 may be part of the lift and propulsion system 980. Although the components 132 and 133 are illustrated as part of the fuel system 970, the components 132 and 133 may correspond to multiple components of the lift and propulsion system 980, the electrical system 926, the hydraulic system 928, the environmental system 930, the communication system 960, or a combination thereof.

The instructions 982, when executed by the processor 102, may cause the processor 102 to perform any of the functions described above. For example, the instructions 982, when executed by the processor 102, may cause the processor 102 to cause the electronic display 104 to display an electronic checklist 106 as described above with reference to FIGS. 1-7. The instructions 982, when executed by the processor 102, may cause the processor 102 to determine whether the electronic checklist 106 includes a checklist item associated with states of multiple components (e.g., the components 132, 133) of a subsystem (e.g., the fuel system 970) associated with the electronic checklist 106 as described above with reference to FIGS. 1-7. The instructions 982, when executed by the processor 102, may cause the processor 102 to, based on determining that the electronic checklist 106 includes the checklist item associated with the states of the multiple components, cause the electronic display 104 to display a single option 118 that is selectable to send control commands to the multiple components as described above with reference to FIGS. 1-7. The processor 102 may, in response to one or more inputs by an operator (e.g., input by the operator selecting the single option 118), send one or more commands to the subsystem controller 120 to change state(s) of one or more components of one or more of the systems 920 of FIG. 9.

Apparatus and methods embodied herein may be employed during any one or more of the stages of the method 800. For example, components or subassemblies corresponding to the production process 806 may be fabricated or manufactured in a manner similar to components or subassemblies produced while the aircraft 100 is in service, for example at 812. Also, one or more of apparatus embodiments, method embodiments, or a combination thereof may be utilized while the aircraft 100 is in service, at 812 for example and without limitation, to maintenance and service, at 814.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. A method comprising:
   displaying, on one or more electronic displays, an electronic checklist and a synoptic page;
   determining that the electronic checklist includes a checklist item associated with states of multiple components of a subsystem associated with the electronic checklist;
   based on determining that the electronic checklist includes the checklist item associated with the states of the multiple components, determining that the checklist item is active; and
   displaying a single option on the synoptic page based on determining that the checklist item is active, the single option selectable to send control commands to the multiple components.

2. The method of claim 1, further comprising sending the control commands to the multiple components responsive to selection of the single option.

3. The method of claim 1, wherein the single option is displayed on the synoptic page of the one or more electronic displays when the checklist item is a next open checklist item.

4. The method of claim 1, wherein the single option is displayed on the synoptic page of the one or more electronic displays when the checklist item is a selected checklist item.

5. The method of claim 1, further comprising displaying, on the synoptic page of the one or more electronic displays, a pop-up window responsive to selection of the single option, wherein contents of the pop-up window depend on determined states of the multiple components.

6. The method of claim 5, further comprising removing, from the pop-up window, an indication of a state for one component of the multiple components, disabling control of the component via the pop-up window, or both.

7. The method of claim 6, wherein the indication is removed and the control of the one component via the pop-up window is disabled responsive to input at the synoptic page after the pop-up window is displayed.

8. The method of claim 7, wherein the input is provided at a portion of the synoptic page associated with a representation of the one component.

9. A system comprising:
   a subsystem including multiple components;
   one or more electronic displays; and
   a processor coupled to the one or more electronic displays, the processor configured to:
      cause the one or more electronic displays to display a synoptic page and an electronic checklist associated with the subsystem;
      determine that the electronic checklist includes a checklist item associated with states of the multiple components;
      based on the determination that the electronic checklist includes the checklist item associated with the states of the multiple components, determine that the checklist item is active, and
      cause the one or more electronic displays to display, on the synoptic page, a single option based on the determination that the checklist item is active, the single option selectable to send control commands to the multiple components.

10. The system of claim 9, wherein the one or more electronic displays includes a touchscreen display.

11. The system of claim 9, wherein the processor is configured to cause the single option to be displayed on the synoptic page of the one or more electronic displays when the checklist item is a next open checklist item.

12. The system of claim 9, wherein the processor is configured to cause the single option to be displayed on the synoptic page of the one or more electronic displays when the checklist item is a selected checklist item.

13. The system of claim 9, wherein the processor is further configured to cause the one or more electronic displays to display, on the synoptic page, a pop-up window responsive to selection of the single option, wherein contents of the pop-up window depend on determined states of the multiple components.

14. The system of claim 13, wherein the processor is further configured to remove, from the pop-up window, an indication of a state for one component of the multiple components responsive to input at the one or more electronic displays after the pop-up window is displayed, disable control of the component via the pop-up window responsive to the input after the pop-up window is displayed, or both.

15. The system of claim 9, wherein the single option corresponds to a macro-function that activates multiple discrete functions of the synoptic page.

16. The system of claim 9, wherein the multiple components include a subset of components of a plurality of first components of the subsystem that are associated with the single option.

17. The system of claim 9, wherein a particular electronic display of the one or more electronic displays displays the electronic checklist and the synoptic page.

18. A non-transitory processor-readable medium storing processor-executable instructions that, when executed by a processor, cause the processor to:
    cause one or more electronic displays to display an electronic checklist and a synoptic page;
    determine that the electronic checklist includes a checklist item associated with states of multiple components of a subsystem associated with the electronic checklist;
    based on the determination that the electronic checklist includes the checklist item associated with the states of the multiple components, determine that the checklist item is active; and
    cause the one or more electronic displays to display, on the synoptic page, a single option based on the determination that the checklist item is active, the single option selectable to send control commands to the multiple components.

19. The non-transitory processor-readable medium of claim 18, wherein the processor-executable instructions further include instructions that, when executed by the processor, cause the processor to cause a subsystem controller to send the control commands to the multiple components responsive to selection of the single option.

20. The non-transitory processor-readable medium of claim 18, wherein the processor-executable instructions further include instructions that, when executed by the processor, cause the processor to cause a subsystem controller to send one or more control commands to a subset of the multiple components, wherein the subset of the multiple components does not include a de-selected component of the multiple components.

* * * * *